INVENTORS.
JAMES F. HOBBINS
EMANUEL F. CAMBRIA
BY Nechs and Hammelman
ATTORNEYS.

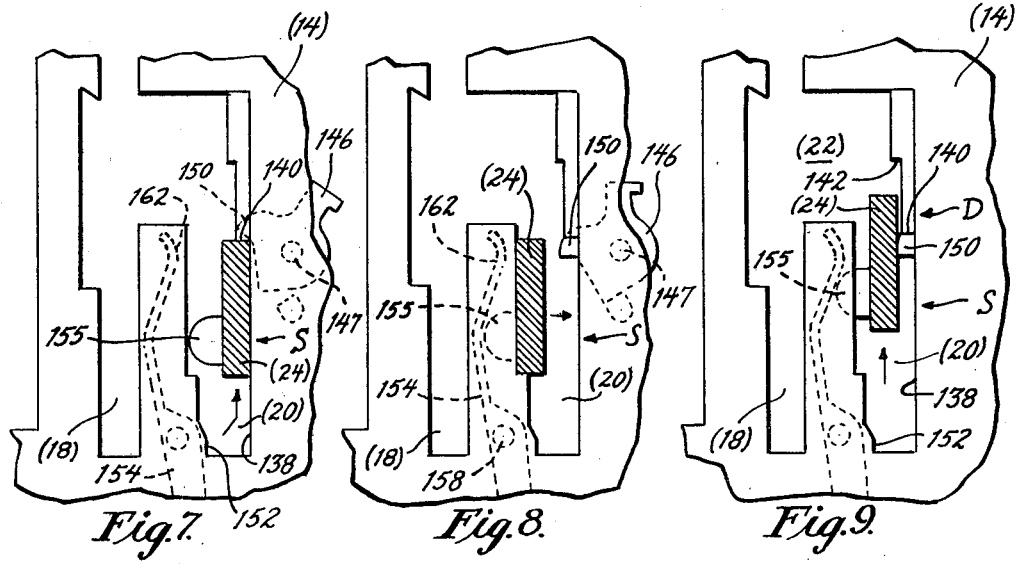
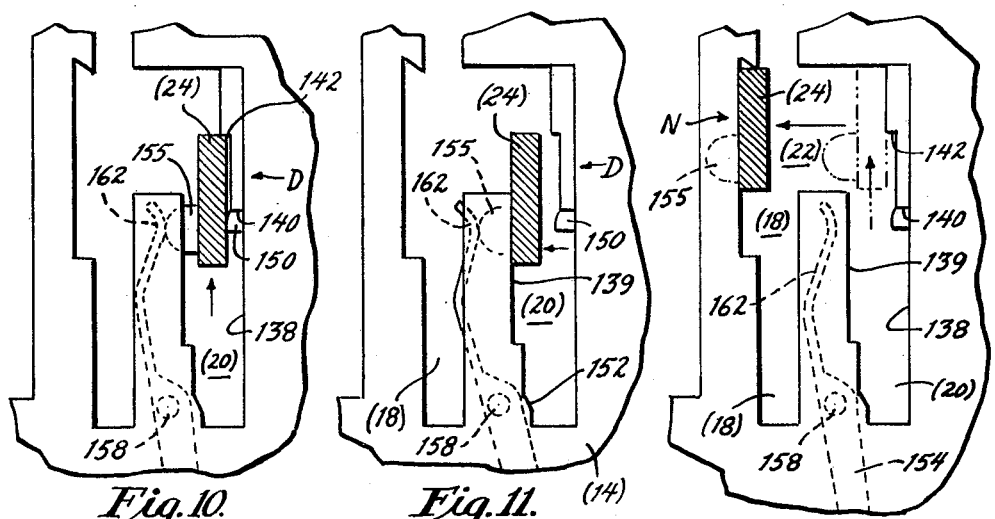
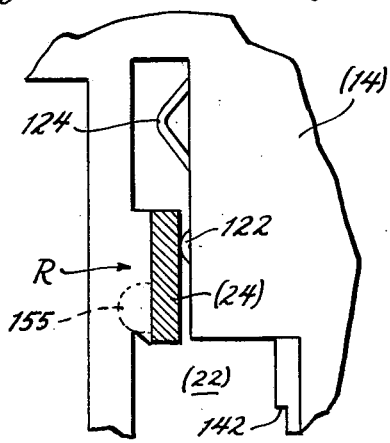

United States Patent Office 3,499,345
Patented Mar. 10, 1970

3,499,345
GEARSHIFT MECHANISM
James F. Hobbins and Emanuel F. Cambria, Philadelphia, Pa., assignors to Hurst-Gambell, Inc., Warminster, Pa., a corporation of Pennsylvania
Filed July 10, 1968, Ser. No. 743,774
Int. Cl. G05g 9/00, 13/00
U.S. Cl. 74—473                        6 Claims

ABSTRACT OF THE DISCLOSURE

A gearshift mechanism including a rotary latch for preventing the shift stick from entering the second gear position, except when the stick is moving from low to second gear position, and including means for insuring positive movement of the shift stick into the third gear position to prevent accidental movement of the stick from second gear position into the neutral position while the engine is operating at high speed.

BACKGROUND

In the following description, the reference numerals "borrowed" from the reference patent are enclosed in parentheses to distinguish them from reference numerals which describe the present invention.

FIG. 1 of Patent No. 3,292,450 shows a shift stick (24) which is operable in channel (20) for rapid acceleration driving and is operable in channel (18) for normal driving. It will be noted that the rapid acceleration channel (20) provides for shifting from low to second and to third gear and to "neutral" position and that it has no "park" and no reverse gear position. The reference patent also shows a cross over passage (22) for moving the shift stick from channel (20) to channel (18) and back, and it shows a sliding plate (108) which prevents the stick from upshifting into the second gear position except by movement longitudinally of channel (20).

THE INVENTION

This invention provides an improved rotary latch for preventing the shift stick from entering second position except by approach from the direction of low gear position and it provides means which insure that the shift stick will automatically and positively enter the third gear position so as to prevent the shift stick from accidentally skipping the third gear position and moving, directly, into the neutral position while the engine is operating at high speed.

In the drawings:

FIG. 7 is a fragmentary plan view and shows the shift stick in second gear position with the protecting rotary latch displaced from the position of FIG. 8 which is its "normal" position.

FIG. 8 is similar to FIG. 7 and shows the shift stick unrestrained.

FIG. 9 is similar to FIG. 7 and shows the shift stick approaching the third gear position.

FIG. 10 is similar to FIG. 7 and shows the shift stick in third gear position and unrestrained.

FIG. 11 is similar to FIG. 10 and shows the shift stick out of the third gear position and ready to be moved to neutral position or to be downshifted to second and/or to low gear position.

FIG. 12 is similar to FIG. 11 and shows the stick in neutral position.

FIG. 13 is similar to the upper position of FIG. 2 but shows the shift in reverse position.

In the interest of brevity, reference is made to Patent No. 3,292,450 for all of the shifting mechanism structure and operation necessary for understanding the present disclosure. More particularly, it is pointed out that, to the extent shown in FIG. 13, this invention resides in improvements associated with the quick acceleration shifting mechanism associated with channel (20).

Figure 1:
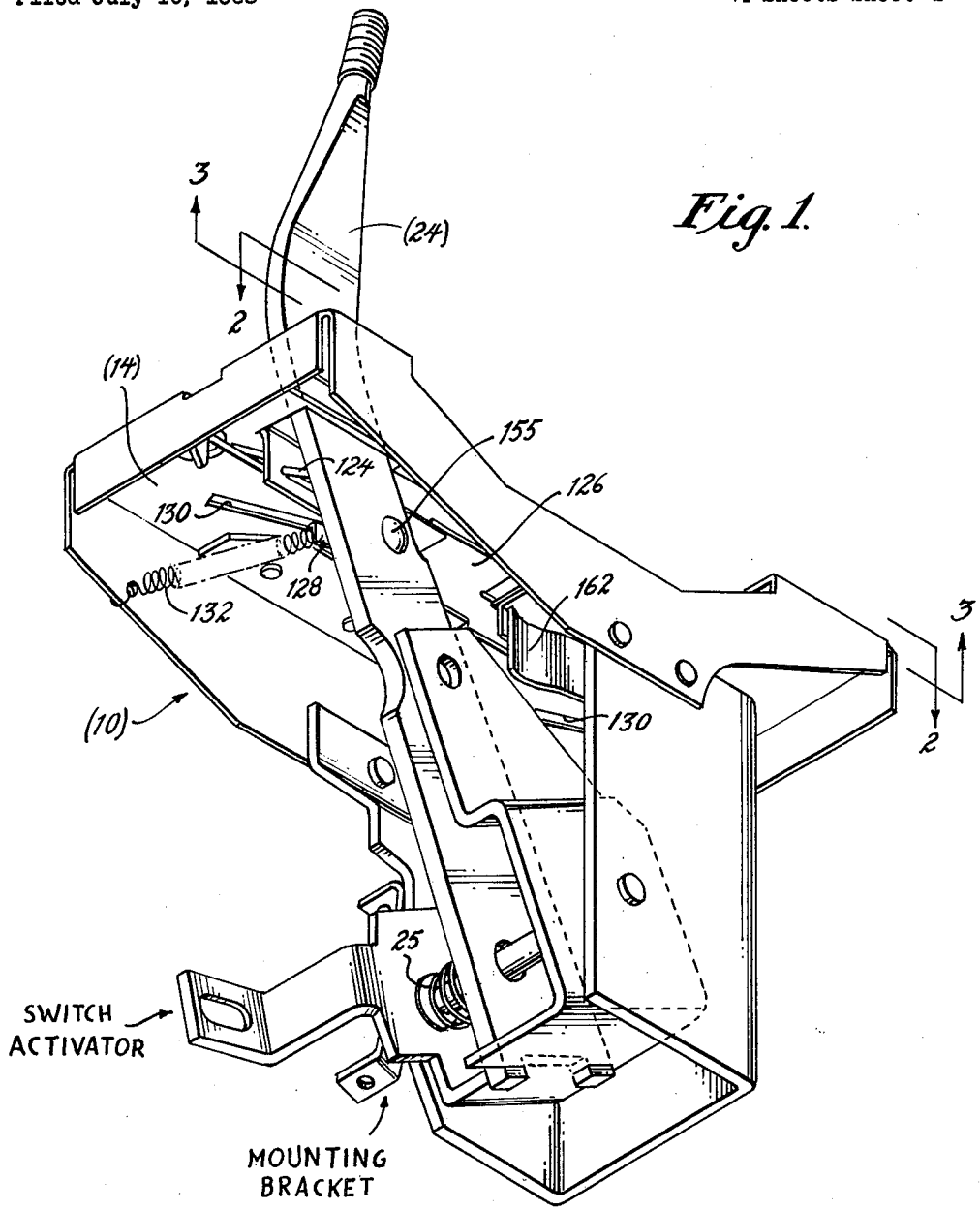
FIG. 1 is a bottom perspective view showing various parts and their relationship.
Figures 4, 5, 6:
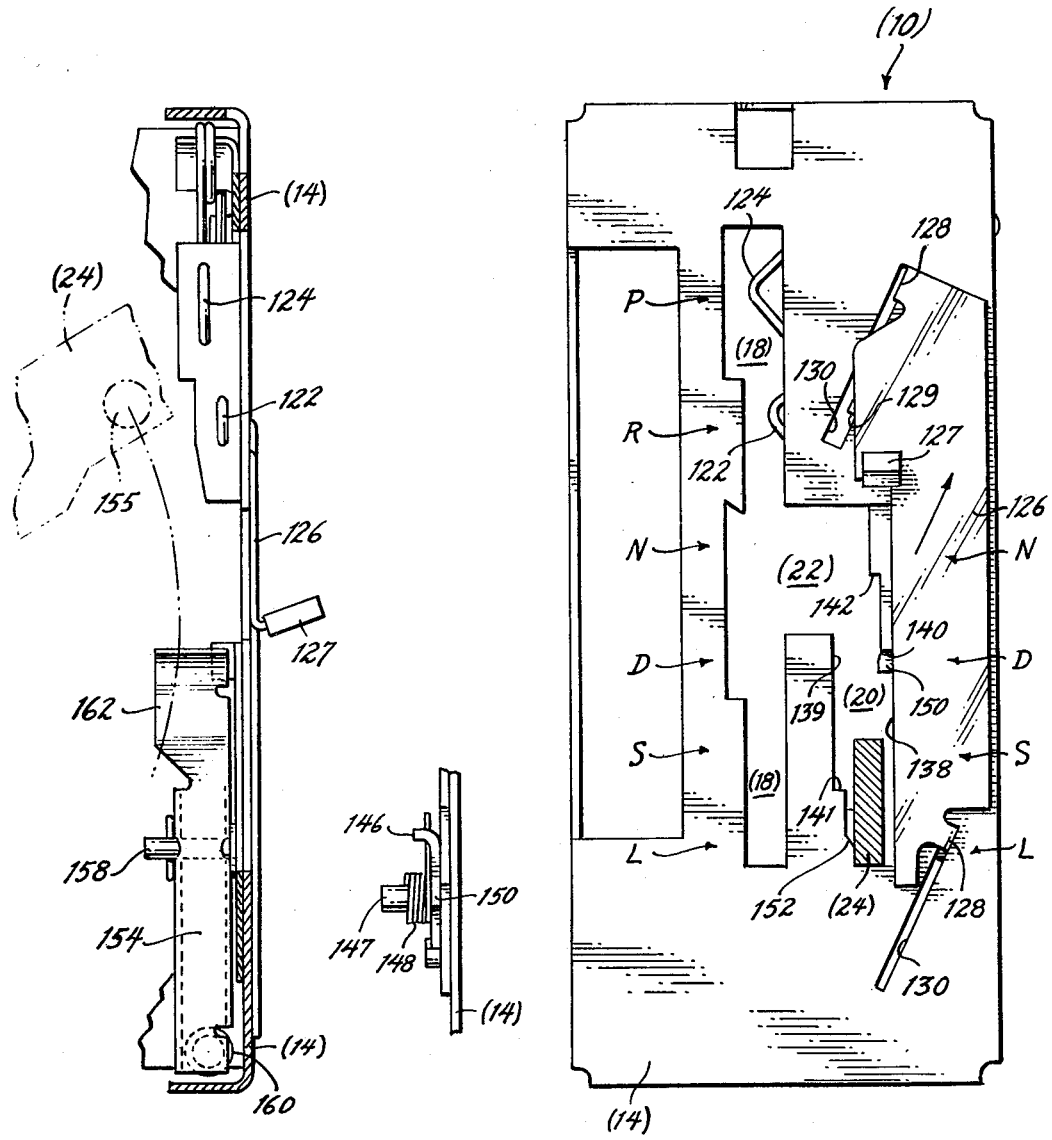
FIG. 4 is a sectional view looking in the direction of line 4—4 on FIG. 3.
FIG. 5 is a view looking in the direction of line 5—5 on FIG. 3.
FIG. 6 is similar to FIG. 2 but shows the slide cover in its forward or open position and the shift stick in first gear position and unrestrained.

As best shown in FIGS. 1 and 6, the gearshift housing (10) to which this invention is applicable includes a top wall (14) having channels 18 and 20, and a shift stick (24) which can be moved to shift to the desired forward or to reverse gear position, or to neutral or to park position. Shift stick (24) is biased to the left as viewed in FIG. 6 by a spring 25, which corresponds to spring (54) of the reference patent. As in said patent, top wall (14) is provided with a crossover (22) which connects channel (18) and (20).

The positions to which the stick may be selectively moved are low (L), second (S), drive (D), neutral (N), reverse (R) and park (P), the latter two being in channel (18) only. At reverse position R is a spring 122 and at park position P is a spring 124 which must be overcome, respectively, before the shift stick may be moved into either of these positions. The arrangement of the positions and the provision of spring 122, facilitate "rocking" the vehicle between reverse and neutral, or between reverse and drive position, or between neutral and drive position without risk of entering the park position into which the shift stick can be moved only by overcoming spring 124.

Top wall (14) of the housing is provided with a sliding cover 126 which corresponds to plate (108) of the reference patent.

Figures 2, 3:
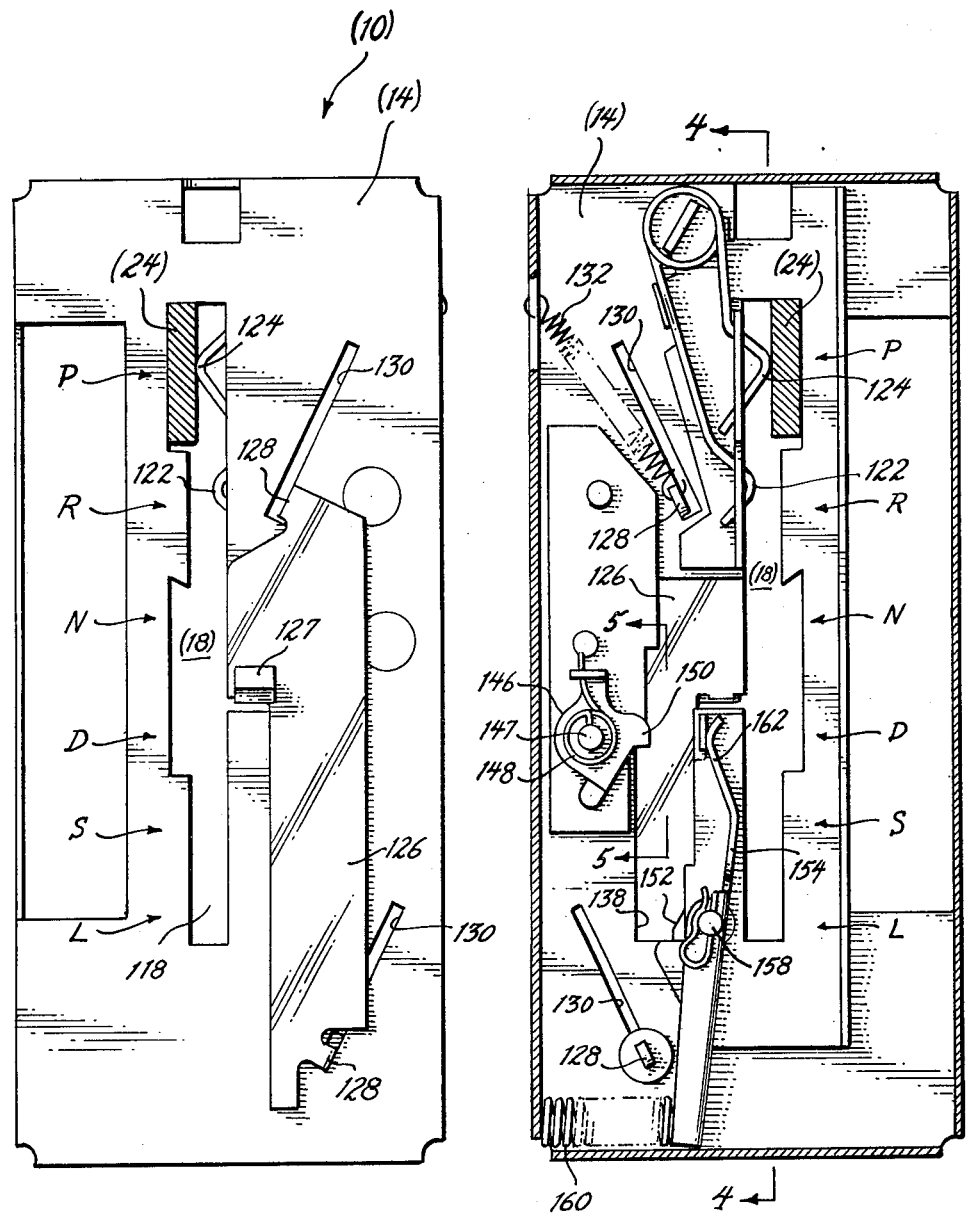
FIG. 2 is a sectional view looking in the direction of line 2—2 on FIG. 1 and showing the slide cover closed and the shift stick in "park" position.
FIG. 3 is a sectional view looking in the direction of line 3—3 on FIG. 1.

Cover 126 is provided with down turned lugs 128 which engage parallel slots 130 in top wall 14, to permit movement of the cover to a first position in which it blocks passage (22) and prevents movement of the shift stick (24) into channel (20) as in FIG. 2 and to a second position in which it does not obstruct cross over passage (22), as in FIG. 6. Slide cover 126 is normally biased to its second position by a spring 132, FIGS. 1 and 4, One of lugs 128, such as the upper lug as viewed in FIGS. 3 and 6 is engageable with a shoulder 129 formed at the lower end of adjacent slot 130 to retain the cover in its first position against the bias of spring 132.

Slide cover 126 is conveniently manipulated by means of a handle 127.

The right hand edge 138 of channel (20 as viewed in FIG. 6) is provided with a stop 140 (FIG. 6) which corresponds to second gear position and with a stop 142 which corresponds to third gear position. These stops are located in the path of movement of the shift stick in up shifting direction and serve to inform the driver that he has reached the second or third gear position. In rapid acceleration shifting the driver tends to "slam" the stick with excessive force which the detent within the transmission cannot withstand so that the shift stick could go past second gear position, and past third gear positions into neutral position. Stops 140 and 142 withstand the impact of the shift stick and prevent it from skipping first or second gear positions. In FIG. 6, the shift stick 24 is shown in low gear position and is at rest or unrestrained. In this "hands off" position, spring 25 biases the shift stick against the left-hand edge 139 of channel (20). To shift to second gear, the shift stick is moved into engagement with edge 138 and upwardly along this edge, as viewed in FIG. 6, until it abuts stop 140. If unrestrained, the shift stick will be moved by spring 25, into engagement with edge 139 of channel (20). To shift to third gear position, the shift stick is moved to the right or into engagement with edge 138 of channel (20), and upwardly, as viewed in FIG. 6 until it abuts third gear stop 142.

As suggested in the reference patent, it is possible for a driver who is trying to shift to third gear position to move across channel (20) before he has moved up far enough to clear stop 140. If this happens, the driver will find himself back in second gear. To overcome this, the reference patent provided slide plate 108 which prevented movement of the shift stick into second gear position except by movement from low gear position with the shift stick moving along, or very close to edge 138 of channel (20).

According to this invention, slide plate 108 of the reference patent is replaced by a rotary latch 146, FIGS. 7 and 8, which is pivoted at 147 and is biased by spring 148, FIG. 3, to the position of FIG. 8 in which finger 150 thereof overlies second gear stop 140. In this position of the latch, the shift stick cannot be engaged with stop 140 by lateral movement across channel (20) because it will abut finger 150. In other words, the shift stick can only be moved to second gear position by movement from the direction of the low gear position and along edge 138 of channel (20) so as to displace the latch.

In order to minimize the lateral movement of the shift stick necessary to shift to second gear position from the "hands off" low gear position of FIG. 6 into which it is biased by spring 25, we provide the lower end of channel (20) with a cam surface 152. By this arrangement, when the shift stick is in low gear position, it will be very close to edge 138 of channel (20) and, therefore, very little lateral movement is required before the shift stick can be moved up into second gear position.

In down-shifting from third gear position, the shift stick may engage stop 141 for normal shifting, or it may be moved, directly from third gear or from the neutral position to low "in-line" shifting. To this end, sufficient clearance is provided to enable the stick to avoid, or clear, stop 141 if so desired.

When shifting from second to third gear position, the driver must exercise a conscious and sufficient effort to overcome the force of spring 25 because, in the absence of such effort, the shift stick may miss third gear stop 142 and may move on to neutral. In a slowly operating engine, this would be an inconvenience only. But, if this happens when the car is operating at a high speed, serious damage can result.

To overcome this difficulty, we provide means which is operative only while the stick is moving from second to third gear position and which automatically insures positive engagement of the stick with stop 142 which insures shifting to third gear position and prevents the shift stick from missing third gear and entering the neutral position.

In FIGS. 7 to 12, the means referred to takes the form of a knob 155 on shift stick (24) and a lever 154 which is fulcrumed to the housing 10 at 158 and one end of which is biased, to the left in FIG. 6 by a coil spring 160. The other end of lever 154 is bent to form a curved portion 162 which protrudes into the space defined by second gear stop 140 and the opposite portion of edge 139 of channel (20). The intermediate portion of lever 154 is bent away from the path of movement of the knob 155. This is shown in FIG. 7 in which the shift stick is in second gear position and in which knob 153 does not press against lever 154. In FIG. 8, the shift stick has been moved out of engagement with second gear stop 140 preparatory to shifting to third gear position. It will be noted that knob 155 now touches lever 154 in advance of portion 162. But, as the shift stick is moved toward third gear position, knob 155 progressively rides up on the bent portion 162 of lever 154 so that the shift stick is biased to the right as viewed in FIG. 9. It will be understood that the strength of spring 160 is greater than the strength of spring 25 so that, without any effort on the part of the driver, the shift stick will be forced into engagement with third gear stop 142 as shown in FIG. 10. It will be noted that, as knob 155 clears portion 162 of lever 154, the shift stick passes from the control of spring 160 back to the control of spring 25 which now biases the shift stick in the direction of edge 139. When moved out of third gear position the shift stick can be moved into the neutral position, or it can be down shifted, step-wise, to second and to low, or it can be "in line" down shifted to low directly. As above stated, enough clearance is provided to permit the shift stick to move to low gear position without engaging down-shift second gear stop, 141. Also, the distance between juxtaposed stops 140 and 141 is slightly greater than the width of the shift stick, measured at that level, so that if the shift stick is moved across channel (20) from engagement with edge 138 of the channel into engagement with the opposite edge 139 thereof, the stick will clear stop 141.

What we claim is:
1. A gear shift mechanism including,
   a gearshift stick,
   means defining an operating channel in which said stick can be selectively moved,
   first means normally moving said stick toward one edge of said channel with a given force,
   at least one gear position defining stop located on the opposite edge of said channel and engageable with said shift stick when said stick is moved to said gear position, and
   second means operative only when said stick is being moved toward said position, for moving said shift stick toward said opposite side with a force greater than the force of said first means to insure movement of said stick into said position and to insure engagement of said shift stick with said stop.
2. The structure recited in claim 1 wherein:
   said first means is a spring acting on one portion of said stick, and
   said second means includes spring-urged means acting on another portion of said stick.
3. The structure recited in claim 1 wherein:
   said stick is movable in up-shifting direction into said gear position or to a neutral position beyond said gear position, and wherein
   said stop is located to prevent unintended movement of the stick beyond said gear position and into said neutral position.
4. A gear shift mechanism including:
   a gearshift stick,
   means defining an operating channel in which said stick is movable in up-shifting or in down-shifting direction,
   a stop located on one edge of said channel and defining a selected gear position,
   said stick being movable longitudinally and transversely of said channel,
   a rotary latch having a finger,
   means mounting said latch adjacent said stop, and
   means normally biasing said latch to a position in which said finger extends beyond said stop to prevent movement of said stick into said selected gear position except by movement of said stick longitudinally of said channel and along said one edge thereof.
5. A gearshift mechanism including:
   (a) a fixed stop
   (b) a shift stick movable along a predetermined path into a predetermined position defined by said stop and also movable transversely to said path, and (c) rotary latch means cooperating with said stop and said shift stick to prevent movement thereof transverse to said path into said predetermined position, said latch means permitting said shift stick to enter into said predetermined position only when moved therein along said path but permitting said stick to move out of said position in a direction transverse to said path.

6. The mechanism according to claim 5 wherein said rotary latch means includes means for normally biasing said latch so as to project into said predetermined path but yieldable to pressure exerted thereon by said stick when the latter is moved along said path toward said stop whereupon said latch means is urged out of said path.

References Cited

UNITED STATES PATENTS 3,292,450   12/1966   Hurst et al. _____ 74—473
3,364,779   1/1968    Cambria _____ 74—473

MILTON KAUFMAN, Primary Examiner